US012701403B2

(12) United States Patent
Turtinen et al.

(10) Patent No.: US 12,701,403 B2
(45) Date of Patent: Aug. 4, 2026

(54) METHODS AND DEVICES FOR REDUCED CAPABILITY

(71) Applicant: Nokia Technologies Oy, Espoo (FI)

(72) Inventors: Samuli Heikki Turtinen, Oulu (FI); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 293 days.

(21) Appl. No.: 18/418,428

(22) Filed: Jan. 22, 2024

(65) Prior Publication Data
US 2024/0251233 A1      Jul. 25, 2024

(30) Foreign Application Priority Data

Jan. 20, 2023      (FI) ..................................... 20235058

(51) Int. Cl.
| | |
|---|---|
| *H04W 8/22* | (2009.01) |
| *H04W 24/10* | (2009.01) |
| *H04W 72/21* | (2023.01) |
| *H04W 76/19* | (2018.01) |
| *H04W 80/02* | (2009.01) |

(52) U.S. Cl.
CPC .............. *H04W 8/22* (2013.01); *H04W 24/10* (2013.01); *H04W 72/21* (2023.01); *H04W 76/19* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2022/0210806 A1 | 6/2022 | Rastegardoost et al. | |
| 2022/0312530 A1 | 9/2022 | Turtinen et al. | |
| 2023/0189380 A1* | 6/2023 | Palat ..................... | H04W 76/11 370/329 |
| 2024/0073960 A1* | 2/2024 | Hossain ............ | H04W 74/0833 |
| 2024/0172297 A1* | 5/2024 | Zheng ..................... | H04W 8/24 |
| 2025/0097800 A1* | 3/2025 | Hu ........................ | H04W 68/00 |

(Continued)

FOREIGN PATENT DOCUMENTS

| | | | | | |
|---|---|---|---|---|---|
| CN | 110650533 A | * | 1/2020 | ............ | H04W 76/27 |
| CN | 117998456 A | * | 5/2024 | .......... | H04L 5/0044 |
| KR | 20210102051 A | * | 8/2021 | .......... | H04W 72/21 |
| WO | 2022/086418 A1 | | 4/2022 | | |
| WO | 2022/154729 A1 | | 7/2022 | | |

OTHER PUBLICATIONS

Author Unknown, Motivation for Rel-18 WI on Enhanced RedCap, Doc. No. RP-212424, pp. 1015, (Year: Sep. 17, 2021).*

(Continued)

*Primary Examiner* — Christopher M Crutchfield
(74) *Attorney, Agent, or Firm* — SQUIRE PATTON BOGGS (US) LLP

(57) ABSTRACT

Embodiments of the present disclosure relate to methods and apparatus for device capability indication. A terminal device obtains a medium access control (MAC) protocol data unit (PDU) comprising a MAC subheader. The MAC subheader comprises a reduced capability (RedCap) bit for indicating that the terminal device supports enhanced RedCap. The terminal device transmits the MAC PDU to a network device. In this way, an indication of the enhanced RedCap can be provided efficiently, for example, without consuming more values of the short logical channel ID (LCID) field in the MAC subheader.

20 Claims, 7 Drawing Sheets

700

710

RECEIVE A MAC PDU FROM A TERMINAL DEVICE, WHEREIN THE MAC PDU COMPRISES A MAC SUBHEADER COMPRISING A REDCAP BIT FOR INDICATING THAT THE TERMINAL DEVICE SUPPORTS ENHANCED REDCAP

720

DETERMINE THAT THE TERMINAL DEVICE SUPPORTS THE ENHANCED REDCAP BASED ON A VALUE OF THE REDCAP BIT IN THE MAC PDU

(56) References Cited

U.S. PATENT DOCUMENTS

| | | | |
|---|---|---|---|
| 2025/0203489 A1* | 6/2025 | Li | H04W 48/02 |
| 2025/0261179 A1* | 8/2025 | Wang | H04W 72/0457 |
| 2025/0294563 A1* | 9/2025 | Ahn | H04L 5/0016 |

OTHER PUBLICATIONS

Author Unknown, Report from Break-out session on NR-NTN, IoT-NTN, RedCap and CE, Doc. No. R2-2213001, pp. 1-47, (Year: Nov. 18, 2022).*

Author Unknown, New WID on enhanced support of reduced capability NR devices, Doc. No. RP-212425, pp. 1-5, (Year: Sep. 13, 2021).*

"Revised WID on Enhanced support of reduced capability NR devices", 3GPP TSG RAN Meeting #98-e, RP-223544, Agenda: 9.3.1.7, Ericsson, Dec. 12-16, 2022, 4 pages.

"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.

"3rd Generation Partnership Project; Technical Specification Group Radio Access Network; NR; User Equipment (UE) radio access capabilities (Release 17)", 3GPP TS 38.306, V17.3.0, Dec. 2022, pp. 1-253.

"3rd Generation Partnership Project; Technical Specification Group Radio Access Network; Study on further NR RedCap UE complexity reduction (Release 18)", 3GPP TR 38.865, V18.0.0, Sep. 2022, pp. 1-52.

"IEEE 802.11", Wikipedia, Retrieved on Feb. 26, 2024, Webpage available at : https://en.wikipedia.org/wiki/IEEE_802.11.

Office Action received for corresponding Finnish Patent Application No. 20235058, dated Jun. 6, 2023, 12 pages.

"3rd Generation Partnership Project; Technical Specification Group Radio Access Network; NR; Medium Access Control (MAC) protocol specification (Release 16)", 3GPP TS 38.321, V16.11.0, Dec. 2022, pp. 1-159.

* cited by examiner

600

610

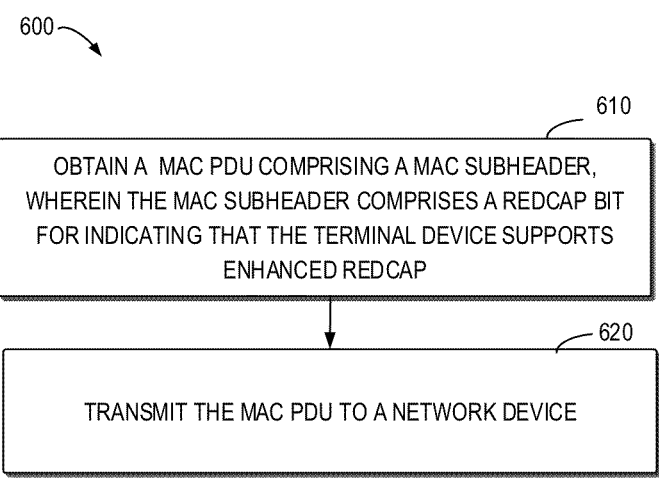

OBTAIN A MAC PDU COMPRISING A MAC SUBHEADER, WHEREIN THE MAC SUBHEADER COMPRISES A REDCAP BIT FOR INDICATING THAT THE TERMINAL DEVICE SUPPORTS ENHANCED REDCAP

620

TRANSMIT THE MAC PDU TO A NETWORK DEVICE

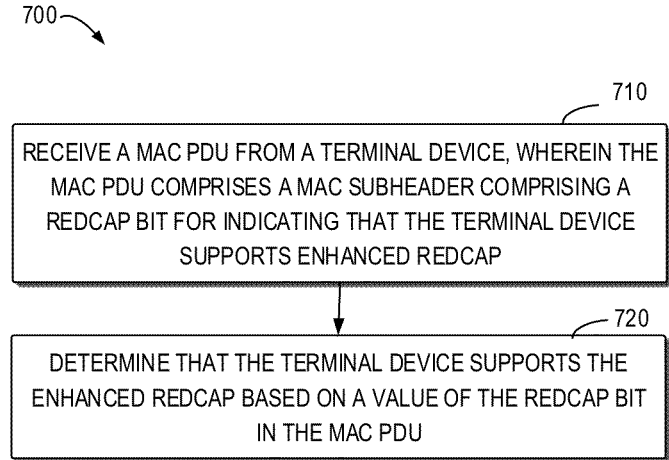

RECEIVE A MAC PDU FROM A TERMINAL DEVICE, WHEREIN THE MAC PDU COMPRISES A MAC SUBHEADER COMPRISING A REDCAP BIT FOR INDICATING THAT THE TERMINAL DEVICE SUPPORTS ENHANCED REDCAP

720

DETERMINE THAT THE TERMINAL DEVICE SUPPORTS THE ENHANCED REDCAP BASED ON A VALUE OF THE REDCAP BIT IN THE MAC PDU

COMMMUNICATION MODULE

810

PROCESSOR

820

822

MEMORY

RAM

824

ROM

830

830

900

METHODS AND DEVICES FOR REDUCED CAPABILITY

FIELD

Various example embodiments relate to the field of telecommunication and in particular, to methods, devices, apparatuses and a computer readable storage medium for reduced capability in a radio access network.

BACKGROUND

In wireless communication systems, different requirements in terms of coverage, data rate, latency, reliability, etc., are defined for devices in various use cases. In Rel-17, reduced-capability (RedCap) is defined for use cases with relatively low cost, low energy consumption, and low data rate requirements, e.g., industrial wireless sensor use cases, smart city use cases and wearable use cases.

In Rel-18, enhanced RedCap with further reduced capabilities is proposed to maximize the benefit of economies of scale while maintaining the integrity of the RedCap ecosystem. Thus, support of the enhanced RedCap needs to be well studied.

SUMMARY

In general, example embodiments of the present disclosure provide a solution for device capability indication.

In a first aspect, there is provided a terminal device. The terminal device comprises one or more transceivers; and one or more processors coupled to the one or more transceivers, the one or more transceivers are configured with the one or more processors to cause the terminal device to: obtain a medium access control, MAC, protocol data unit, PDU, wherein the MAC PDU comprises a MAC subheader, wherein the MAC subheader comprises a reduced capability, RedCap, bit for indicating that the terminal device supports enhanced RedCap; and transmit the MAC PDU to a network device.

In a second aspect, there is provided a network device. The network device comprises one or more transceivers; and one or more processors coupled to the one or more transceivers, the one or more transceivers are configured with the one or more processors to cause the network device to: receive a MAC PDU from a terminal device, wherein the MAC PDU comprises a MAC subheader, wherein the MAC subheader comprises a reduced capability, RedCap bit for indicating that the terminal device supports enhanced RedCap; and determine that the terminal device supports the enhanced RedCap based on a value of the RedCap bit in the MAC PDU.

In a third aspect, there is provided a method at a terminal device. The method comprises obtaining a medium access control, MAC, protocol data unit, PDU, wherein the MAC PDU comprises a MAC subheader, wherein the MAC subheader comprises a reduced capability, RedCap, bit for indicating that the terminal device supports enhanced RedCap; and transmitting the MAC PDU to a network device.

In a fourth aspect, there is provided a method at a network device. The method comprises receiving a MAC PDU from a terminal device, wherein the MAC PDU comprises a MAC subheader, wherein the MAC subheader comprises a reduced capability, RedCap bit for indicating that the terminal device supports enhanced RedCap; and determining that the terminal device supports the enhanced RedCap based on a value of the RedCap bit in the MAC PDU.

In a fifth aspect, there is provided an apparatus for a terminal device. The apparatus comprises: means for obtaining a medium access control, MAC, protocol data unit, PDU, wherein the MAC PDU comprises a MAC subheader, wherein the MAC subheader comprises a reduced capability, RedCap, bit for indicating that the terminal device supports enhanced RedCap; and means for transmitting the MAC PDU to a network device.

In a sixth aspect, there is provided an apparatus for a network device. The apparatus comprises: means for receiving a MAC PDU from a terminal device, wherein the MAC PDU comprises a MAC subheader, wherein the MAC subheader comprises a reduced capability, RedCap bit for indicating that the terminal device supports enhanced RedCap; and means for determining that the terminal device supports the enhanced RedCap based on a value of the RedCap bit in the MAC PDU.

In a seventh aspect, there is provided a terminal device. The terminal device comprises at least one processor; and at least one memory including computer program codes, wherein the at least one memory and the computer program codes are configured to, with the at least one processor, cause the terminal device to: obtain a medium access control, MAC, protocol data unit, PDU, wherein the MAC PDU comprises a MAC subheader, wherein the MAC subheader comprises a reduced capability, RedCap, bit for indicating that the terminal device supports enhanced RedCap; and transmit the MAC PDU to a network device.

In an eighth aspect, there is provided a network device. The network device comprises at least one processor; and at least one memory including computer program codes, wherein the at least one memory and the computer program codes are configured to, with the at least one processor, cause the network device to: receive a MAC PDU from a terminal device, wherein the MAC PDU comprises a MAC subheader, wherein the MAC subheader comprises a reduced capability, RedCap bit for indicating that the terminal device supports enhanced RedCap; and determine that the terminal device supports the enhanced RedCap based on a value of the RedCap bit in the MAC PDU.

In a ninth aspect, there is provided a non-transitory computer readable medium comprising program instructions for causing an apparatus to perform at least the method according to any one of the above third to fourth aspect.

In a tenth aspect, there is provided a computer program comprising instructions, which, when executed by an apparatus, cause the apparatus at least to: obtain, by a terminal device, a medium access control, MAC, protocol data unit, PDU, wherein the MAC PDU comprises a MAC subheader, wherein the MAC subheader comprises a reduced capability, RedCap, bit for indicating that the terminal device supports enhanced RedCap; and transmit the MAC PDU to a network device.

In an eleventh aspect, there is provided a computer program comprising instructions, which, when executed by an apparatus, cause the apparatus at least to: receive, by a network device, a MAC PDU from a terminal device, wherein the MAC PDU comprises a MAC subheader, wherein the MAC subheader comprises a reduced capability, RedCap bit for indicating that the terminal device supports enhanced RedCap; and determine that the terminal device supports the enhanced RedCap based on a value of the RedCap bit in the MAC PDU.

In a twelfth aspect, there is provided a terminal device. The terminal device comprises: obtaining circuitry configured to obtain a medium access control, MAC, protocol data unit, PDU, wherein the MAC PDU comprises a MAC subheader, wherein the MAC subheader comprises a reduced capability, RedCap, bit for indicating that the terminal device supports enhanced RedCap; and transmitting circuitry configured to transmit the MAC PDU to a network device.

In a thirteenth aspect, there is provided a network device. The network device comprises: receiving circuitry configured to receive a MAC PDU from a terminal device, wherein the MAC PDU comprises a MAC subheader, wherein the MAC subheader comprises a reduced capability, RedCap bit for indicating that the terminal device supports enhanced RedCap; and determining circuitry configured to determine that the terminal device supports the enhanced RedCap based on a value of the RedCap bit in the MAC PDU.

In a fourteenth aspect, there is provided an apparatus. The apparatus comprises means for: obtaining, by a terminal device, a medium access control, MAC, protocol data unit, PDU, wherein the MAC PDU comprises a MAC subheader, wherein the MAC subheader comprises a reduced capability, RedCap, bit for indicating that the terminal device supports enhanced RedCap; and transmitting the MAC PDU to a network device.

In a fifteenth aspect, there is provided an apparatus. The apparatus comprises means for: receiving, by a network device, a MAC PDU from a terminal device, wherein the MAC PDU comprises a MAC subheader, wherein the MAC subheader comprises a reduced capability, RedCap bit for indicating that the terminal device supports enhanced RedCap; and determine that the terminal device supports the enhanced RedCap based on a value of the RedCap bit in the MAC PDU.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 6 illustrates an example flowchart of a method implemented at a terminal device according to some embodiments of the present disclosure;

FIG. 7 illustrates an example flowchart of a method implemented at a network device according to some embodiments of the present disclosure;

Throughout the drawings, the same or similar reference numerals represent the same or similar element.

DETAILED DESCRIPTION

Figure 1:
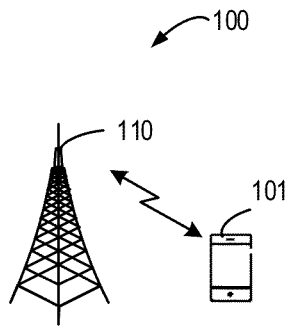
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IOT) and so on. Furthermore, the communications between a terminal device and a network device in the communication network may be performed according to any suitable generation communication protocols, including, but not limited to, the third generation (3G), the fourth generation (4G), 4.5G, the fifth generation (5G), or the further sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a headmounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

It is to be understood that the present disclosure described herein can be implemented in various manners other than the ones described below.

As mentioned above, in Rel-18, the enhanced RedCap is proposed to have further capability reduction than the Rel-17 RedCap. The enhanced RedCap (also referred to as Rel-18 RedCap) may provide new radio (NR) support for low-tier devices between existing low power wide area (LPWA) devices and the Rel-17 RedCap devices. For example, the supported peak data rate for the Rel-18 RedCap may target to 10 Mbps.

Compared with the Rel-17 RedCap, the enhanced RedCap may have power saving/energy efficiency enhancements. For example, enhanced extended discontinuous reception (eDRX) in a radio resource control (RRC) inactive state above 10.24 s may be supported.

The enhanced RedCap may have enhancements of complexity/cost reduction. In one aspect, the enhanced RedCap may support further reduction of bandwidth than the Rel-17 RedCap. In addition, all UE capabilities applicable to a Rel-17 RedCap UE may be applicable to a Rel-18 RedCap UE by default unless otherwise specified.

In Rel-17, an early indication of the RedCap is specified to enable network awareness of UE capabilities. Specifically, TS 38.300 specifies that a RedCap UE may be identified by the network during a random access procedure via MSG 3/MSG A from a RedCap specific logical channel ID(s) (LCID(s)) in a media access control (MAC) subheader and optionally via MSG 1/MSG A (a physical random access channel (PRACH) occasion or PRACH preamble).

For RedCap UE identification via MSG 1/MSG A, RedCap specific random access configuration may be configured by the network. For MSG 3/MSG A, a RedCap UE may be identified by the dedicated LCID values, which is indicated for common control channel (CCCH) identification (CCCH or CCCH1), regardless whether RedCap specific random access configuration is configured by the network.

For example, a dedicated LCID value of 35 may indicate a CCCH of size 48 bits for a RedCap UE. A dedicated LCID value of 36 may indicate a CCCH of size 64 bits for a RedCap UE. In other words, in Rel-17, a RedCap UE may use the dedicated LCID values indicating a CCCH for a RedCap UE to enable the network to identify it as a RedCap UE. For example, this identification may be exploited by the network, e.g., for access control, admission control, etc.

As can be seen from the above, in Rel-17, dedicated LCID values specified for a CCCH for a RedCap UE may be used to support the indication of a RedCap UE. However, the size of the LCID field in the MAC subheader is only 6 bits, and most of them are already occupied and currently there are only 6 reserved values after Rel-17.

Thus, for the enhanced RedCap proposed in Rel-18, if a Rel-18 RedCap UE uses dedicated LCID values for the UE capability identification (e.g., early indication of the enhanced RedCap) similarly to Rel-17, two additional LCID values (one for a CCCH of size 48 bits and the other for a CCCH of size 64 bits) may be required. This means the very scarce resource of values of the LCID field in the MAC subheader is further reduced.

According to embodiments of the present disclosure, there is provided a solution for reduced capability indication, especially for enhanced RedCap indication. In this solution, instead of using dedicated LCID values, a bit in the MAC subheader is used to indicate the enhanced RedCap of a terminal device. Specifically, a terminal device obtains a MAC, protocol data unit, PDU, wherein the MAC PDU comprises a MAC subheader. The MAC subheader comprises a reduced capability, RedCap, bit for indicating that the terminal device supports enhanced RedCap. The terminal device transmits the MAC PDU to a network device.

In this way, an indication of the enhanced RedCap can be provided efficiently, for example, without consuming more values of the short LCID field in the MAC subheader for an uplink shared channel (UL-SCH). The indication may enable the network to know the enhanced RedCap of the terminal device, thereby supporting the enhanced RedCap in any efficient way due to not using any dedicated LCID values.

The term "RedCap" used herein may refer to reduced capability compared to regular devices. The RedCap was introduced for use cases with relatively low cost, low energy consumption, and low data rate requirements, e.g., industrial wireless sensor use cases, smart city use cases and wearable use case. The reduced capability may be those as specified in 3GPP TS 38.306. The term "RedCap device" refers to a device with reduced capabilities, for example, conformed to 3GPP TS 38.306. A RedCap device has reduced capabilities with the intention to have lower complexity with respect to non-RedCap UEs.

The term "enhanced RedCap" used herein may refer to further reduced capability compared to the RedCap, for example, introduced in Rel-17. The enhanced RedCap may be used for use cases with relatively low cost, low energy consumption, and low data rate requirements, targeting 10 Mbps peak rate. The term "enhanced RedCap device" may refer to a device with further reduced capability compared to the RedCap device as specified in Rel-17, for example, a Rel-18 RedCap device as specified in 3GPP TR 38.865. As one example, the term "enhanced RedCap device" may generally refer to a device different compared to the RedCap device as specified in Rel-17, for example, a Rel-18 RedCap device.

For example, the enhanced RedCap device may for example have the following enhancement over the RedCap device, Further reduced UE complexity in FR1 [RAN1, RAN2, RAN4]

UE BB bandwidth reduction

5 MHz BB bandwidth only for PDSCH (for both unicast and broadcast) and PUSCH, with 20 MHz RF bandwidth for UL and DL The other physical channels and signals are still allowed to use a BWP up to the 20 MHz maximum UE RF+BB bandwidth.

Support additional separate early indication(s) [RAN1, RAN2]

UE peak data rate reduction

Relaxation of the constraint ($v_{Layers} \cdot Q_m \cdot f \geq 4$) for peak data rate reduction The relaxed constraint is, e.g., 1 (instead of 4).

The parameters ($v_{Layers}$, $Q_m$, f) can be as in Rel-17 RedCap.

Both 15 kHz SCS and 30 kHz SCS are supported.

Aim to define at most one Rel-18 RedCap UE type for further UE complexity reduction.

The existing UE capability framework is used, and changes to capability signalling are specified only if necessary. By default, all UE capabilities applicable to a Rel-17 RedCap UE are applicable unless otherwise specified.

Hereinafter, Rel-17 RedCap may be used as an example of RedCap and Rel-18 RedCap may be used as an example of enhanced RedCap.

Principle and embodiments of the present disclosure will be described in detail below with reference to the accompanying drawings. However, it is to be noted that these embodiments are illustrated as examples and not intended to limit scope of the present application in any way.

Reference is first made to FIG. 1, which illustrates an example communication network 100 in which embodiments of the present disclosure can be implemented. As illustrated in FIG. 1, the communication network 100 includes a network device (e.g. a base station) 110 and a terminal device (e.g. a user equipment) 101 served by the network device 110. The terminal device 101 can communicate with the network device 110 via one or more physical communication channels or links.

In the communication network 100, a link from the terminal device 101 to the network device 110 is referred to as a UL, while a link from the network device 110 to the terminal device 101 is referred to as a downlink (DL). The UL and DL can be collectively referred to as beam pair link. In UL, the terminal device 101 is a TX device (or a transmitter) and the network device 110 is a RX device (or a receiver). In DL, the network device 110 is a transmitting (TX) device (or a transmitter) and the terminal device 101 is a receiving (RX) device (or a receiver).

It is to be understood that the numbers of network devices, terminal devices and/or TRPs are only for the purpose of illustration without suggesting any limitations to the present disclosure. The communication network 100 may include any suitable number of BSs, UEs and/or TRPs adapted for implementing implementations of the present disclosure.

It should be noted that the network device in the present disclosure may be control unit (CU) of a gNB, or it may be distributed unit (DU) of the gNB, or it may be gNB. TRP may be part of gNB. The present disclosure has not restriction of the implementation of the network device.

In the communication network 100, the terminal device 101 obtains a MAC PDU comprising a MAC subheader. The MAC subheader comprises a reduced capability, RedCap, bit for indicating that the terminal device 101 supports enhanced RedCap. The terminal device 101 transmits the MAC PDU to the network device 110.

The network device 110 may receive the MAC PDU and determine that the terminal device 101 supports the enhanced RedCap based on a value of the RedCap bit in the MAC PDU.

Communications in the communication system 100 may be implemented according to any proper communication protocol(s), comprising, but not limited to, the third generation (3G), the fourth generation (4G) and the fifth generation (5G) or beyond, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: code division multiple access (CDMA), frequency division multiple access (FDMA), time division multiple access (TDMA), frequency division duplex (FDD), time division duplex (TDD), multiple-input multiple-output (MIMO), orthogonal frequency division multiple (OFDM), discrete Fourier transform spread OFDM (DFT-s-OFDM) and/or any other technologies currently known or to be developed in the future.

Figure 2:
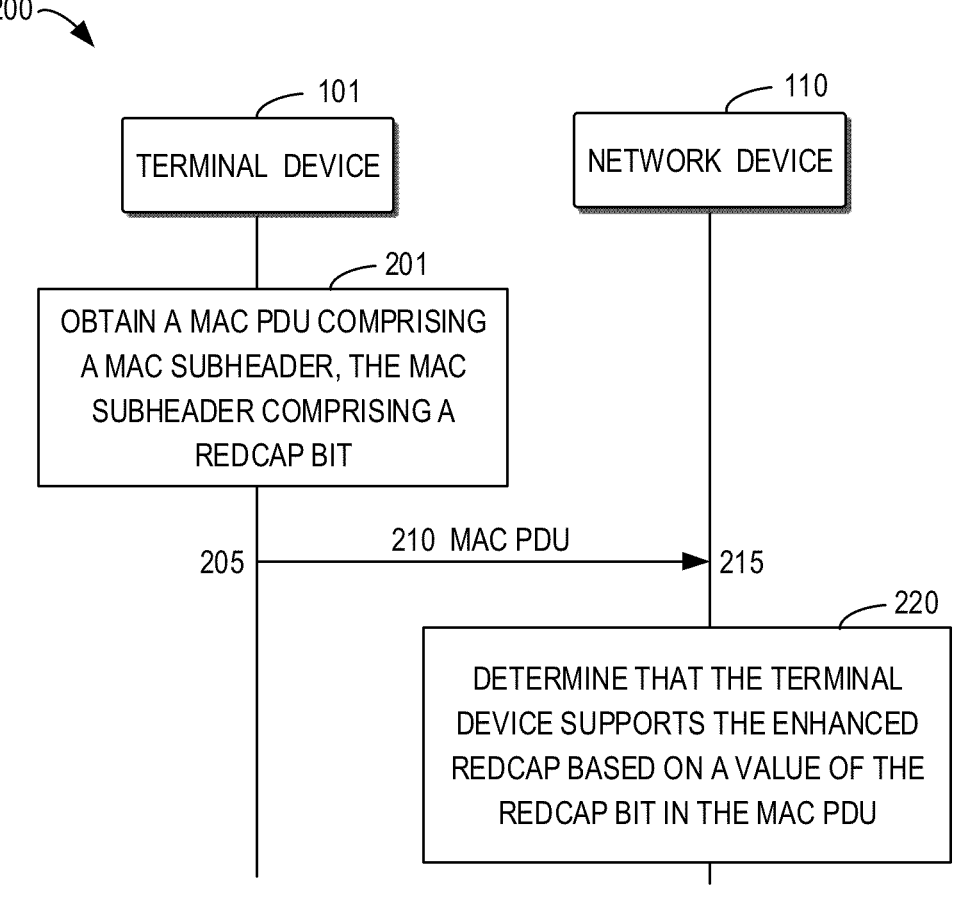
FIG. 2 illustrates an example of a process for indicating the enhanced RedCap according to an embodiment of the present disclosure.

Reference is now made to FIG. 2, which shows an example of a process 200 for indicating the enhanced RedCap according to an embodiment of the present disclosure. For the purpose of discussion, the process 200 will be described with reference to FIG. 1. The terminal device 101 and the network device 110 may be involved in the process 200.

In the process 200, the terminal device 101 obtains 201 a MAC PDU comprising a MAC subheader. The MAC subheader comprises a RedCap bit (also referred to as RC bit for short). The RedCap bit may be used for indicating that the terminal device 101 supports enhanced RedCap.

The enhanced RedCap herein indicates that the terminal device is configured with at least further reduction of bandwidth (e.g., baseband bandwidth) than a RedCap device. As described hereabove, an enhanced RedCap device may have further enhancements compared to Rel-17 RedCap.

In some embodiments of the present disclosure, the RC bit may be a new bit in the MAC subheader, for example, a bit newly added to the MAC subheader as currently defined in the current standards.

In some embodiments of the present disclosure, a reserved R bit in the MAC subheader may be used as the RedCap bit for indicating the enhanced RedCap. In other words, the terminal device 101 may consume or replace a reserved bit in the MAC subheader by the RedCap bit.

In Rel-17, it is specified that a MAC subheader for fixed sized MAC CE, padding and a MAC SDU containing a UL CCCH may comprise two reserved R bits, a LCID field and an optional extended LCID (eLCID) field. In such a case, the reserved bit in the MAC subheader may be used to indicate the enhanced RedCap, i.e., it may be replaced by the RedCap bit. In some embodiments, a first bit in the MAC subheader may be used as the RedCap bit. Alternatively or additionally, a second bit in the MAC subheader may be used as the RedCap bit.

Figure 3:
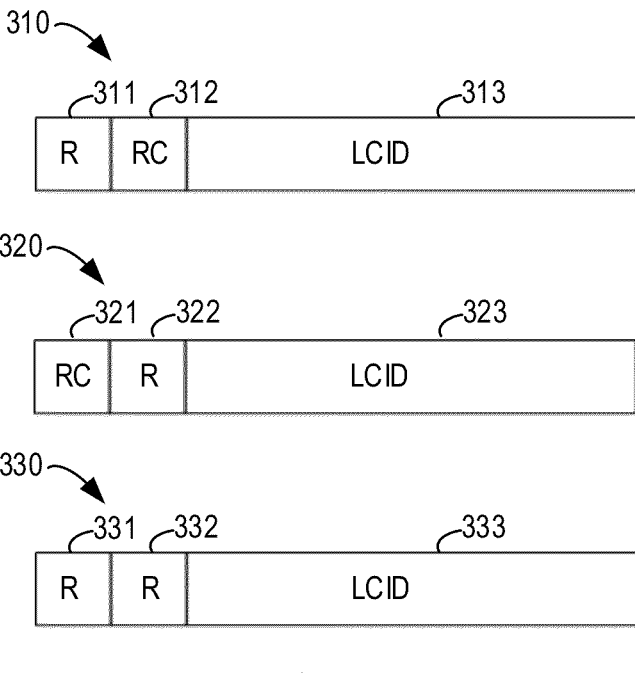
FIG. 3 illustrates examples of a MAC subheader according to some embodiments of the present disclosure.

For illustrations purposes, FIG. 3 illustrates examples of a MAC subheader according to some embodiments of the present disclosure. As illustrated in FIG. 3, a MAC subheader 310 may comprise a reserved R bit 311, a RedCap bit (illustrated as RC bit) 312 and a LCID field 313. As illustrated in the figure, a second bit in the MAC subheader 310 is used as the RedCap (RC) bit, which may be used to indicate that the terminal device 101 support the enhanced RedCap.

FIG. 3 further illustrates another MAC subheader 320, which may comprise a RedCap bit (illustrated as RC bit) 321, a reserved R bit 322 and a LCID field 323. Compared with the MAC subheader 310, a first bit in the MAC subheader 320 may be used as the RedCap bit.

In addition, FIG. 3 further illustrates a MAC subheader 330 comprising two reserved bits, i.e., a first R bit 331 and a second R bit 332, and a LCID field 333, which may be a MAC subheader for regular terminal devices. In other words, there is no RedCap bit in the MAC subheader 330, and thus the MAC subheader 330 may be a MAC subheader for fixed sized MAC SDU containing UL CCCH except for a RedCap device (especially, an enhanced RedCap device).

In some embodiments, the MAC subheader may further comprise an eLCID field. For example, one or two additional octets may be present in the MAC subheader containing the eLCID field and the one or two additional octets may follow the octet containing LCID field.

Figure 4:
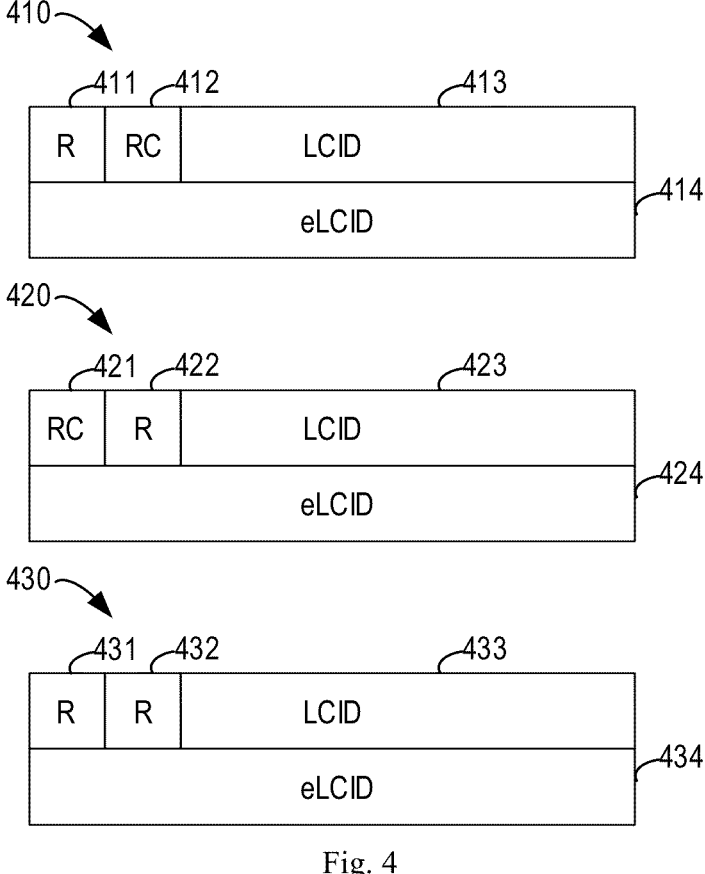
FIG. 4 illustrates examples of a MAC subheader according to some embodiments of the present disclosure.

For illustrations purposes, FIG. 4 illustrates examples of a MAC subheader according to some embodiments of the present disclosure. Different from FIG. 3, in FIG. 4 MAC subheaders 410, 420 and 430 further comprise eLCID fields 414, 424 and 434.

Specifically, as illustrated in FIG. 4, a MAC subheader 410 may comprise a reserved R bit 411, a RedCap bit (illustrated as RC bit) 412, a LCID field 413 and an eLCID field 414. In the MAC subheader 410, a second bit is used as the RedCap bit.

A MAC subheader 420 may comprise a RedCap bit (illustrated as RC bit) 421, a reserved R bit 422, a LCID field 423 and an eLCID field 424. In the MAC subheader 420, a first bit may be used as the RedCap bit.

In addition, a MAC subheader 430 may comprise a first R bit 431, a second R bit 432, a LCID field 433 and an eLCID 434. Similar to the MAC subheader 330, the MAC subheader 430 may be a MAC subheader for fixed sized MAC SDU containing UL CCCH except for a RedCap device (especially, an enhanced RedCap device).

The RedCap bit may be encoded as or set to a value to indicate that the terminal device transmitting the MAC subheader is an enhanced RedCap device, i.e., the terminal device supports the enhanced RedCap. In some embodiments, the RedCap bit may be set to a first value (for example "1") to indicate that the terminal device 101 supports the enhanced RedCap. The RedCap bit may be set to a second different value (for example, "0") or not encoded to indicate that the terminal device 101 does not support the enhanced RedCap.

In some embodiments, the MAC subheader may further comprise a LCID field. The LCID field may be encoded to indicate the support of the Rel-17 RedCap as described above. For example, a value of the LCID field may be set to 35 or 36 for the indication of the Rel-17 RedCap.

In some embodiments, the RedCap bit may be used in combination with the LCID field in the MAC subheader to indicate the terminal device's capabilities. In some embodiments, the terminal device 101 may encode the RedCap bit based on whether the terminal device 101 supports the enhanced RedCap and when the LCID field indicates a CCCH. In other words, only when the LCID field indicates or is encoded to indicate a CCCH or an UL CCCH, the terminal device 101 will encode the RedCap bit in the MAC subheader. Alternatively or additionally, the terminal device 101 may encode the RedCap bit when the LCID field indicates a CCCH for a RedCap device. Particularly, the terminal device 101 may encode the RedCap bit when a value of the LCID field is set to 35 or 36. In such a way, it is possible to reduce the unnecessary encoding at the terminal device, improving encoding efficiency and enhancing the encoding performance. Furthermore, in such a way, it is possible to reduce the unnecessary decoding at the network device 110 since the RedCap bit needs to be decoded only when the LCID field indicates a CCCH or a CCCH for a RedCap device, improving decoding efficiency and enhancing the decoding performance.

Alternatively, the LCID field and the RC bit may be used independent of each other. In other words, the LCID field may be used to indicate the RedCap, the RC bit may be used to indicate the enhanced Redcap, and the LCID field and the RC bit are used separately.

Reference is made back to FIG. 2, the terminal device 101 transmits 205 the MAC PDU 210 to the network device 110. In some embodiments, the MAC PDU 210 may comprise a MAC SDU corresponding to the MAC subheader comprising the RedCap bit, and the MAC SDU indicates an RRC setup request. Alternatively or additionally, the corresponding SDU may indicate an RRC resume request. Alternatively or additionally, the corresponding SDU may indicate an RRC reestablishment request. Alternatively or additionally, the corresponding SDU may indicate any RRC request message by the terminal device 101.

In this way, similar to Rel-17 RedCap, an early indication of the enhanced RedCap may be enabled to bring benefits for the network device to know the UE capabilities, e.g., in terms of a physical uplink shared channel (PUSCH) and a physical downlink shared channel (PDSCH), while random access procedure is ongoing or upon random access procedure completion. Moreover, the early indication of the enhanced RedCap may be provided in Msg 3/Msg A without consuming more values of the short LCID field and naturally not increasing the size of Msg 3/Msg A.

At the network side, the network device 110 receives the MAC PDU 210. The network device 110 determines 220 that the terminal device 101 supports the enhanced RedCap based on a value of the RedCap bit in the MAC PDU 210.

In some embodiments, the network device 110 may determine that the terminal device 101 supports the enhanced RedCap based on determining that the value of the RedCap bit is set to 1.

In some embodiments, in a case where the RedCap bit is used in combination with the LCID field in the MAC subheader, the network device 110 may obtain a value of the RedCap bit based on determining that the LCID field in the MAC subheader indicates a CCCH. In other words, the network device 110 may first obtain the LCID field and only when the LCID field indicating a CCCH, it decides to check the value of RedCap bit. Then, it may determine whether the terminal device 101 supports the enhanced RedCap based on the value of RedCap bit. In such a way, it is possible to reduce the unnecessary decoding operation at the network device, improving decoding efficiency and enhancing the decoding performance.

Alternatively or additionally, the network device 110 may obtain a value of the RedCap bit based on determining that the LCID field in the MAC subheader indicates a CCCH for a Rel-17 RedCap device. For example, the network device 110 may obtain a value of the RedCap bit based on determining that a value of the LCID field in the MAC subheader is set to 35 or 36.

In this way, the network device 110 may determine to decode the RedCap bit in the MAC subheader based on determining that a RedCap specific LCID for a CCCH is used in the MAC subheader. Thus, the network device 110 may not need to determine the value of the RedCap bit for every UE transmitting a MAC SDU containing a CCCH.

In some embodiments, the RedCap bit may be implemented in a different way from those illustrated in FIGS. 3 to 4. For example, the MAC subheader may comprise the RedCap bit, a format (F) field, a length (L) field and a LCID field. In current Rel-17, it is specified that a MAC subheader except for fixed sized MAC CE, padding and a MAC SDU containing a UL CCCH may comprise a reserved R bit, an F field, a LCID field, an L field and an optional eLCID field. According to embodiments of the present disclosure, the reserved bit may be replaced by the RedCap bit.

Figure 5:
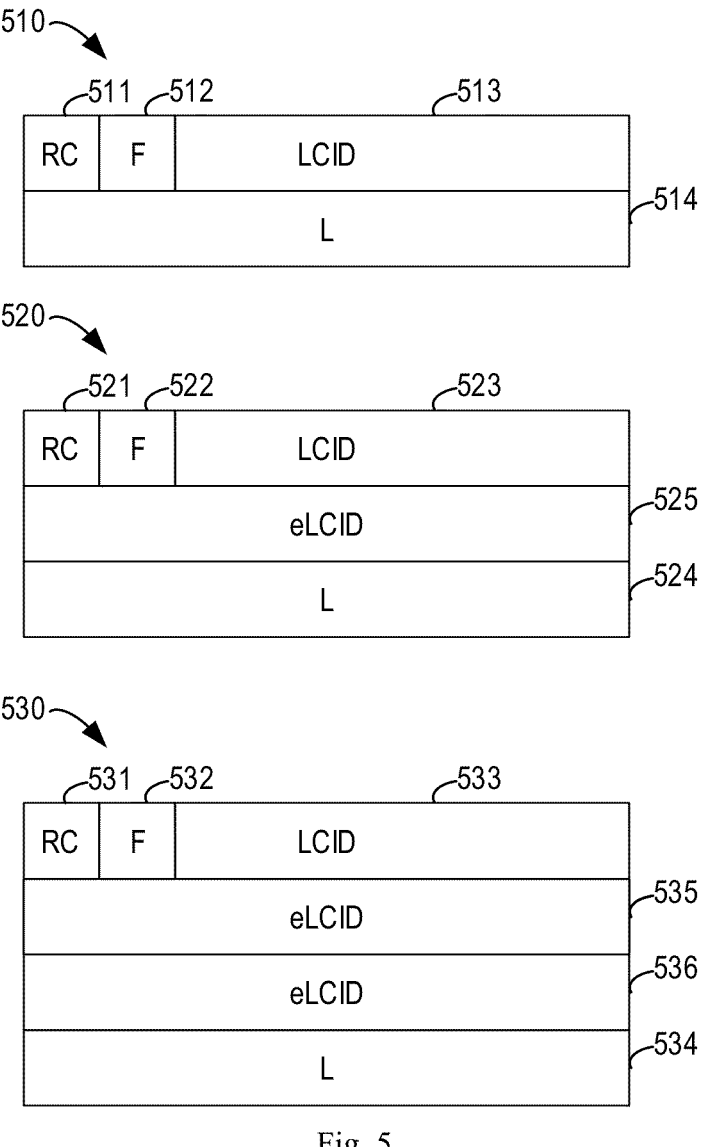
FIG. 5 illustrates examples of a MAC subheader according to some embodiments of the present disclosure.

FIG. 5 illustrates examples of a MAC subheader according to some embodiments of the present disclosure. As illustrated in FIG. 5, a MAC subheader 510 comprises a RedCap bit (illustrated as RC bit) 511, an F field 512, a LCID field 513, and an L field 514. FIG. 5 further illustrates a MAC subheader 520 comprising a RedCap bit (illustrated as RC bit) 521, an F field 522, a LCID field 523, an L field 514, and an eLCID field 525. FIG. 5 further illustrates a MAC subheader 530 comprising a RedCap bit (illustrated as RC bit) 531, an F field 532, a LCID field 533, an L field 534, a first eLCID field 535 and a second eLCID field 536. Thus, by replacing the R bit with the RedCap bit in such an MAC sub-header, it is also possible to indicate the enhanced RedCap of a terminal device.

Reference is now made to FIG. 6, which shows an example flowchart of a method 600 implemented at a terminal device according to some embodiments of the present disclosure. For the purpose of discussion, the method 600 will be described from the perspective of the terminal device 101 with reference to FIG. 1.

At block 610, the terminal device 101 obtains a MAC PDU, wherein the MAC PDU comprises a MAC subheader. The MAC subheader comprises a RedCap bit for indicating that the terminal device supports enhanced RedCap. At block 620, the terminal device 101 transmits the MAC PDU to the network device 110.

In some embodiments, a value of the RedCap bit may be set to 1 to indicate that the terminal device supports the enhanced RedCap.

In some embodiments, a reserved, R, bit in the MAC subheader may be used as the RedCap bit.

In some embodiments, a first bit in the MAC subheader may be used as the RedCap bit or a second bit in the MAC subheader may be used as the RedCap bit.

In some embodiments, the MAC subheader may further comprise a logical channel ID, LCID, field.

In some embodiments, the RedCap bit may be encoded based on whether the terminal device supports the enhanced RedCap when the LCID field indicates a common control channel, CCCH.

In some embodiments, the LCID field may indicate a CCCH for a RedCap device and a value of the LCID field may be set to 35 or 36.

In some embodiments, the MAC subheader may be a MAC subheader for a MAC service data unit, SDU, containing an uplink common control channel, UL CCCH.

In some embodiments, the MAC subheader may comprise the RedCap bit, a format field, a length field and a LCID field.

In some embodiments, a MAC subheader for a fixed sized MAC SDU containing UL CCCH except for an enhanced RedCap device may comprise two R bits, and an LCID field.

In some embodiments, the MAC subheader may further comprise an extended LCID field.

In some embodiments, the MAC PDU may comprise a MAC SDU corresponding to the MAC subheader and the MAC SDU indicates one of the following: a radio resource control, RRC, setup request, an RRC resume request, or an RRC reestablishment request.

In some embodiments, the enhanced RedCap may indicate that the terminal device is configured with at least further reduction of bandwidth than a RedCap device.

FIG. 7 shows an example flowchart of a method 700 implemented at a network device in accordance with some embodiments of the present disclosure. For the purpose of discussion, the method 300 will be described from the perspective of the network device 110 with reference to FIG. 1.

As illustrated in FIG. 7, at block 710, the network device 110 receives a MAC PDU from the terminal device 101, wherein the MAC PDU comprises a MAC subheader, wherein the MAC subheader comprises a RedCap bit for indicating that the terminal device 101 supports enhanced RedCap. At block 720, the network device 110 determines that the terminal device 101 supports the enhanced RedCap based on a value of the RedCap bit in the MAC PDU.

In some embodiments, the network device 110 may determine that the terminal device supports the enhanced RedCap based on determining that the value of the RedCap bit is set to 1.

In some embodiments, a reserved, R, bit in the MAC subheader may be used as the RedCap bit.

In some embodiments, a first bit in the MAC subheader may be used as the RedCap bit or a second bit in the MAC subheader may be used as the RedCap bit.

In some embodiments, the MAC subheader may further comprise a logical channel ID, LCID, field.

In some embodiments, the network device 110 may obtain a value of the RedCap bit based on determining that the LCID field in the MAC subheader indicates a CCCH; and determine that the terminal device 101 supports the enhanced RedCap based on determining that the value of the RedCap bit is set to 1.

In some embodiments, the network device 110 may obtain the value of the RedCap bit based on determining that the LCID field indicates a CCCH for a RedCap device and a value of the LCID field is set to 35 or 36.

In some embodiments, the MAC subheader may be a MAC subheader for a MAC service data unit, SDU, containing an uplink common control channel, UL CCCH.

In some embodiments, the MAC subheader may comprise the RedCap bit, a format field, a length field and a LCID field.

In some embodiments, a MAC subheader for a fixed sized MAC SDU containing UL CCCH except for an enhanced RedCap device may comprise two R bits, and an LCID field.

In some embodiments, the MAC subheader may further comprise an extended LCID field.

In some embodiments, the MAC PDU may comprise a MAC SDU corresponding to the MAC subheader and the MAC SDU indicates one of the following: a radio resource control, RRC, setup request, an RRC resume request, or an RRC reestablishment request.

In some embodiments, the enhanced RedCap may indicate that the terminal device is configured with at least further reduction of bandwidth than a RedCap device.

In some embodiments, an apparatus capable of performing any of the method 600 (for example, the terminal device 101) may comprise means for performing the respective steps of the method 600. The means may be implemented in any suitable form. For example, the means may be implemented in a circuitry or software module.

In some embodiments, the apparatus comprises: means for obtaining a medium access control, MAC, protocol data unit, PDU, wherein the MAC PDU comprises a MAC subheader, wherein the MAC subheader comprises a reduced capability, RedCap, bit for indicating that the terminal device supports enhanced RedCap; and means for transmitting the MAC PDU to a network device.

In some embodiments, a value of the RedCap bit may be set to 1 to indicate that the terminal device supports the enhanced RedCap.

In some embodiments, a reserved, R, bit in the MAC subheader may be used as the RedCap bit.

In some embodiments, a first bit in the MAC subheader may be used as the RedCap bit or a second bit in the MAC subheader may be used as the RedCap bit.

In some embodiments, the MAC subheader may further comprise a logical channel ID, LCID, field.

In some embodiments, the RedCap bit may be encoded based on whether the terminal device supports the enhanced RedCap when the LCID field indicates a common control channel, CCCH.

In some embodiments, the LCID field may indicate a CCCH for a RedCap device and a value of the LCID field may be set to 35 or 36.

In some embodiments, the MAC subheader may be a MAC subheader for a MAC service data unit, SDU, containing an uplink common control channel, UL CCCH.

In some embodiments, the MAC subheader may comprise the RedCap bit, a format field, a length field and a LCID field.

In some embodiments, a MAC subheader for a fixed sized MAC SDU containing UL CCCH except for an enhanced RedCap device may comprise two R bits, and an LCID field.

In some embodiments, the MAC subheader may further comprise an extended LCID field.

In some embodiments, the MAC PDU may comprise a MAC SDU corresponding to the MAC subheader and the MAC SDU indicates one of the following: a radio resource control, RRC, setup request, an RRC resume request, or an RRC reestablishment request.

In some embodiments, the enhanced RedCap may indicate that the terminal device is configured with at least further reduction of bandwidth than a RedCap device.

In some embodiments, the apparatus further comprises means for performing other steps in some embodiments of the method 600. In some embodiments, the means comprises at least one processor; and at least one memory including computer program code, the at least one memory and computer program code configured to, with the at least one processor, cause the performance of the apparatus.

In some embodiments, an apparatus capable of performing any of the method 700 (for example, the network device 110) may comprise means for performing the respective steps of the method 700. The means may be implemented in any suitable form. For example, the means may be implemented in a circuitry or software module.

In some embodiments, the apparatus comprises: means for receiving a MAC PDU from a terminal device, wherein the MAC PDU comprises a MAC subheader, wherein the MAC subheader comprises a reduced capability, RedCap bit for indicating that the terminal device supports enhanced RedCap; and means for determining that the terminal device supports the enhanced RedCap based on a value of the RedCap bit in the MAC PDU.

In some embodiments, a reserved, R, bit in the MAC subheader may be used as the RedCap bit.

In some embodiments, a first bit in the MAC subheader may be used as the RedCap bit or a second bit in the MAC subheader may be used as the RedCap bit.

In some embodiments, the MAC subheader may further comprise a logical channel ID, LCID, field.

In some embodiments, the means for determining that the terminal device supports the enhanced RedCap may comprise: means for obtaining a value of the RedCap bit based on determining that the LCID field in the MAC subheader indicates a CCCH; and means for determining that the terminal device 101 supports the enhanced RedCap based on determining that the value of the RedCap bit is set to 1.

In some embodiments, the means for obtaining the value of the RedCap bit may comprise: means for obtaining the value of the RedCap bit based on determining that the LCID field indicates a CCCH for a RedCap device and a value of the LCID field is set to 35 or 36.

In some embodiments, the MAC subheader may be a MAC subheader for a MAC service data unit, SDU, containing an uplink common control channel, UL CCCH.

In some embodiments, the MAC subheader may comprise the RedCap bit, a format field, a length field and a LCID field.

In some embodiments, a MAC subheader for a fixed sized MAC SDU containing UL CCCH except for an enhanced RedCap device may comprise two R bits, and an LCID field.

In some embodiments, the MAC subheader may further comprise an extended LCID field.

In some embodiments, the MAC PDU may comprise a MAC SDU corresponding to the MAC subheader and the MAC SDU indicates one of the following: a radio resource control, RRC, setup request, an RRC resume request, or an RRC reestablishment request.

In some embodiments, the enhanced RedCap may indicate that the terminal device is configured with at least further reduction of bandwidth than a RedCap device.

In some embodiments, the apparatus further comprises means for performing other steps in some embodiments of the method 700. In some embodiments, the means comprises at least one processor; and at least one memory including computer program code, the at least one memory and computer program code configured to, with the at least one processor, cause the performance of the apparatus.

Figure 8:
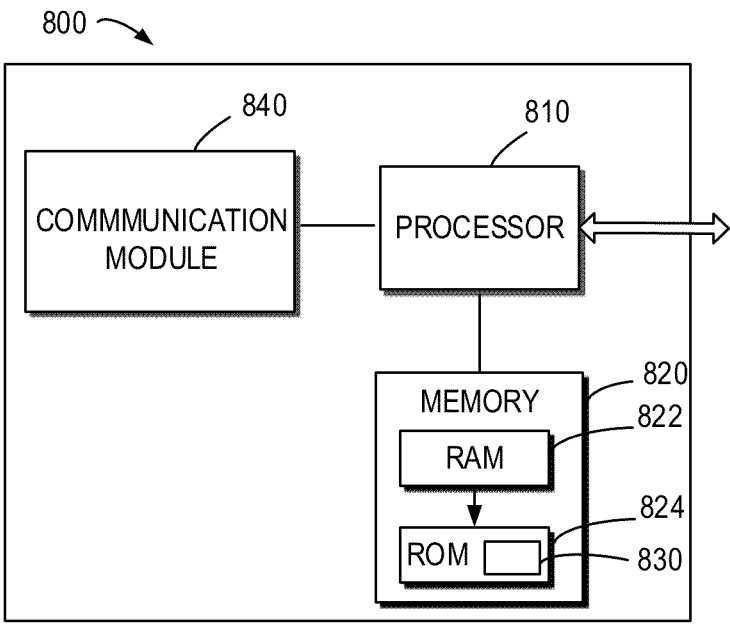
FIG. 8 illustrates an example simplified block diagram of an apparatus that is suitable for implementing embodiments of the present disclosure.

FIG. 8 is a simplified block diagram of a device 800 that is suitable for implementing embodiments of the present disclosure. The device 800 may be provided to implement the communication device, for example the terminal device 101, the network device 110 as shown in FIG. 1. As shown, the device 800 includes one or more processors 810, optionally one or more memories 820 coupled to the processor 810, and one or more communication modules 840 coupled to the processor 810.

The communication module 840 is for bidirectional communications. The communication module 840 may have at least one antenna to facilitate communication. The communication interface may represent any interface that is necessary for communication with other network elements.

The communication module 840 may include for example one or more transceivers. The one or more transceivers may be coupled with one or more antennas, to wirelessly transmit and receive communication signals. The one or more transceivers allow the communication device to communicate with other devices that may be wired and/or wireless. The transceiver may support one or more radio technologies. For example, the one or more transceivers may include a cellular subsystem, a WLAN subsystem, and/or a Bluetooth™ subsystem. In some examples, the one or more transceivers may include processors, controllers, radios, sockets, plugs, buffers, and like circuits/devices used for connecting to and communication on networks.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that may be executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 6-7. The embodiments of the present disclosure may also be implemented by hardware or by a combination of software and hardware.

Figure 9:
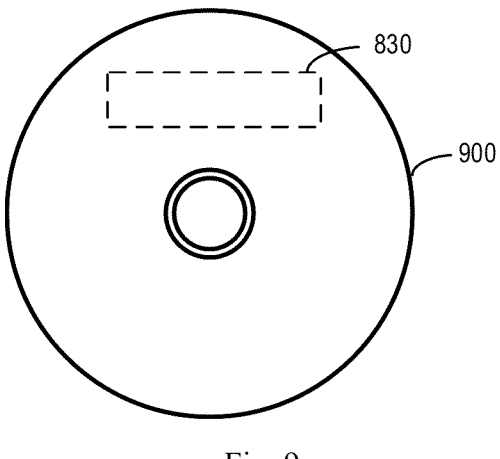
FIG. 9 illustrates a block diagram of an example computer readable medium in accordance with some embodiments of the present disclosure.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 or 700 as described above with reference to FIGS. 6-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
at least one processor; and
at least one non-transitory memory including computer program code;
wherein the at least one memory and the computer program code are configured to, with the at least one processor, cause the terminal device at least to:

obtain a medium access control protocol data unit wherein the medium access control protocol data unit comprises a medium access control subheader, wherein the medium access control subheader comprises a reduced capability bit in combination with the logical channel identifier field in the medium access control subheader for indicating that the terminal device supports enhanced reduced capability; and
transmit the medium access control protocol data unit to a network device.

2. The terminal device of claim 1, wherein a value of the reduced capability bit is set to 1 to indicate that the terminal device supports the enhanced reduced capability.

3. The terminal device of claim 1, wherein a reserved bit in the medium access control subheader is used as the reduced capability bit.

4. The terminal device of claim 1, wherein the medium access control subheader further comprises a logical channel ID field.

5. The terminal device of claim 1, wherein the medium access control subheader is a medium access control subheader for a medium access control service data unit containing an uplink common control channel.

6. The terminal device of claim 1, wherein the medium access control subheader comprises the reduced capability bit, a format field, a length field and a logical channel ID field.

7. The terminal device of claim 1, wherein a medium access control subheader for a fixed sized medium access control service data unit containing uplink common control channel except for an enhanced reduced capability device comprises two reserved bits, and a logical channel ID field.

8. The terminal device of claim 1, wherein the medium access control subheader further comprises an extended logical channel ID field.

9. The terminal device of claim 1, wherein the medium access control protocol data unit comprises a medium access control service data unit corresponding to the medium access control subheader and the medium access control service data unit indicates one of the following:
a radio resource control setup request,
a radio resource control resume request, or
a radio resource control reestablishment request.

10. The terminal device of claim 1, wherein the enhanced reduced capability indicates that the terminal device is configured with at least further reduction of bandwidth than a reduced capability device.

11. A network device, comprising:
at least one processor; and
at least one non-transitory memory including computer program code;
wherein the at least one memory and the computer program code are configured to, with the at least one processor, cause the network device at least to:
receive a medium access control protocol data unit from a terminal device, wherein the medium access control protocol data unit comprises a medium access control subheader, wherein the medium access control subheader comprises a reduced capability bit in combination with the logical channel identifier field in the medium access control subheader for indicating that the terminal device supports enhanced reduced capability; and
determine that the terminal device supports the enhanced reduced capability based on a value of the reduced capability bit in the medium access control protocol data unit.

12. The network device of claim 11, wherein the network device is caused to determine that the terminal device supports the enhanced reduced capability based on:

determining that the value of the reduced capability bit is set to 1.

13. The network device of claim 11, wherein a reserved bit in the medium access control subheader is used as the reduced capability bit.

14. The network device of claim 11, wherein the medium access control subheader further comprises a logical channel ID field.

15. The network device of claim 11, wherein the medium access control subheader is a medium access control subheader for a medium access control service data unit containing an uplink common control channel.

16. The network device of claim 11, wherein the medium access control subheader comprises the reduced capability bit, a format field, a length field and a logical channel ID field.

17. The network device of claim 11, wherein a medium access control subheader for a fixed sized medium access control service data unit containing an uplink common control channel except for an enhanced reduced capability device comprises two reserved bits, and a logical channel ID field.

18. The network device of claim 11, wherein the medium access control subheader further comprises an extended logical channel ID field.

19. The network device of claim 11, wherein the medium access control protocol data unit comprises a medium access control service data unit corresponding to the medium access control subheader and the medium access control service data unit indicates one of the following:

a radio resource control setup request, a radio resource control resume request, or a radio resource control reestablishment request.

20. A method, comprising:

obtaining, by a terminal device, a medium access control protocol data unit wherein the medium access control protocol data unit comprises a medium access control subheader, wherein the medium access control subheader comprises a reduced capability bit in combination with the logical channel identifier field in the medium access control subheader for indicating that the terminal device supports enhanced reduced capability; and transmitting, by the terminal device, the medium access control protocol data unit to a network device.

* * * * *